(12) United States Patent
Martin

(10) Patent No.: US 7,670,213 B2
(45) Date of Patent: Mar. 2, 2010

(54) METHOD OF MONITORING THE PRODUCTION HISTORY OF CONSUMABLE ANIMAL PRIMAL CUTS

(75) Inventor: Keith D. Martin, Waynesburg, PA (US)

(73) Assignee: Elysian Fields Farms, Inc., Waynesburg, PA (US)

( * ) Notice: Subject to any disclaimer, the term of this patent is extended or adjusted under 35 U.S.C. 154(b) by 751 days.

(21) Appl. No.: 11/219,422

(22) Filed: Sep. 2, 2005

(65) Prior Publication Data

US 2006/0053031 A1    Mar. 9, 2006

Related U.S. Application Data

(60) Provisional application No. 60/608,332, filed on Sep. 9, 2004.

(51) Int. Cl.
*A22B 5/00* (2006.01)

(52) U.S. Cl. .................................................... 452/198

(58) Field of Classification Search .............. 119/51.02, 119/511, 840, 841, 842; 452/52, 53
See application file for complete search history.

(56) References Cited

U.S. PATENT DOCUMENTS

| | | | | |
|---|---|---|---|---|
| 5,478,990 A * | 12/1995 | Montanari et al. | ......... 235/375 |
| 5,673,647 A * | 10/1997 | Pratt | ........................ 119/51.02 |
| 6,000,361 A * | 12/1999 | Pratt | ........................ 119/51.02 |
| 6,135,035 A * | 10/2000 | Masek | ........................ 110/228 |
| 6,148,249 A * | 11/2000 | Newman | .................... 700/225 |
| 6,211,789 B1 | 4/2001 | Oldham et al. | |
| 6,318,289 B1 * | 11/2001 | Pratt | ........................ 119/51.02 |
| 6,323,771 B1 | 11/2001 | Payne et al. | |
| 6,516,746 B2 * | 2/2003 | Pratt | ........................ 119/51.02 |
| 6,569,092 B1 | 5/2003 | Guichon et al. | |
| 6,642,946 B1 | 11/2003 | Janes et al. | |
| 6,659,039 B1 * | 12/2003 | Larsen | .................... 119/51.02 |
| 6,664,897 B2 | 12/2003 | Pape et al. | |
| 6,691,135 B2 | 2/2004 | Pickett et al. | |
| 6,805,075 B2 * | 10/2004 | Pratt | ........................ 119/51.02 |
| 6,859,672 B2 * | 2/2005 | Roberts et al. | ................. 700/89 |
| 6,878,052 B2 * | 4/2005 | Andersson | ................... 452/149 |
| 7,347,161 B2 * | 3/2008 | Pratt | ........................ 119/51.02 |

* cited by examiner

*Primary Examiner*—Thomas Price
(74) *Attorney, Agent, or Firm*—The Webb Law Firm

(57) ABSTRACT

A method of monitoring the production history of consumable animal primal cuts. Data collected from animal breeders and animal feeders is provided to a centralized data management system. An independent auditor also collects data on the operations of animal feeders. The data is analyzed to identify trends or relationships between aspects of the production lifecycle. Quality data on the quality of the primal cuts is also provided to the data management system. Feedback on procedures to be adjusted to improve primal cut quality can be provided to feeders.

11 Claims, 2 Drawing Sheets

METHOD OF MONITORING THE PRODUCTION HISTORY OF CONSUMABLE ANIMAL PRIMAL CUTS

CROSS REFERENCE TO RELATED APPLICATIONS

This application claims the benefit of U.S. Provisional Application No. 60/608,332 entitled "Process of Raising Animals and Meat Processing" filed Sep. 9, 2004.

BACKGROUND OF THE INVENTION

1. Field of the Invention

The present invention relates to methods of monitoring the production history of animal cuts, more particularly a method for determining the source and treatment of animals that are raised for slaughter for human consumption.

2. Prior Art

Livestock are typically bred at ranches or breeding farms. Once the animals reach a certain age and/or weight, they are weaned and leave the breeding farms and proceed to a feeding facility. The feeding facility rears the animals for a period of time before they are sent to feed lots or directly to packers for slaughter. After the animals have been slaughtered, the primal cuts from the animal are distributed by a processor and ultimately sold to consumers such as retailers.

Particularly in the production of lamb, there is little vertical integration between the processes conducted by each of the breeding farm, feeder facility, packer, processor and consumer. Breeders and feeders could improve the animal performance and realize greater gains with performance based compensation if there was greater cooperation between each of the stages within the industry.

Factors and variables that can effect the quality of the meat include the genetics of the animals bred, herd management, food supply (including foraging systems), water supply, health conditions and the like. A breeder maintains a herd of animals that are believed to exhibit acceptable traits for the meat industry and maintains the young animals until weaning with a goal of their acceptance by a feeder facility. However, the impact of a breeder's practices on meat quality is not clearly understood. A feeder facility can impact the rate of growth of its animals and can maintain their health while they are at the feeder facility, but the direct impact of these actions on the quality of the meat product is also unknown. In addition, there is a growing concern about quality assurance in the livestock processing cycle. Consumers (both retailers and individuals) seek assurances about the health and quality of meat products produced for human consumption. As such, there is an opportunity for producers and processors of livestock who can establish that the quality assurance procedures are in place within their industry segment.

In the lamb industry, there are typically four segments: the lamb breeder, the feeder, the packer and the processor. The breeder maintains a herd of sheep that are used to produce lambs. Ewes are bred to rams so that lambs are produced primarily for meat production with some lambs retained as replacements for the herd. The lambs are usually weaned from their mothers and transferred to a feeder facility at about two months of age. Typically, the main objectives of the breeder facility is to produce lambs that are healthy and vigorous with high weaning weights at the lowest cost and produce the best meat as determined by factors such as tenderness and taste at a low cost. The breeder is so removed from the consumer that the final meat quality is not known to the breeder. In most instances, the breeder can only determine the quality of the animals leaving its facility by their size (especially weight) and conformation (the visible physical characteristics of the portions of the lambs that will become primal cuts).

The feeder facility receives the lambs and feeds them for four to six months with the objective of adding weight at a reasonable pace while keeping the animals healthy. The feeder facility typically collects and uses information such as the identity of the animals, their beginning, ending and periodic weight measurements, water and food supplies, veterinary treatments such as vaccinations, as well as any other significant events that occurred during the animals' lives. Once the lambs reach a marketable weight of about 100 to 110 pounds, they are sold to a packer for slaughter. As is true for the breeders, the feeder facilities have limited tools for assessing the quality of the animals reared. Feeder facilities can assess animal size and conformation, as well as their health and nutrition to approximate their quality. The packer typically slaughters the animal and then chills, ages and cuts the carcass into various cuts of meats and packs those cuts for shipment to consumers. The packer has the opportunity to assess the quality of animals it receives. However, that information generally is not shared with breeders or feeders in a manner by which breeders or feeders can improve their processes to improve the meat quality.

In each of these four segments, the breeder, the feeder, the packer and the processor of cuts, have attempted to optimize their own operations. There has been relatively little emphasis on, or opportunity for cooperative optimization, efforts between these industry segments. However, there is a growing recognition across these industry segments that for both quality assurance reasons and for the improvement of the lamb industry in general, there is a need to improve the collection of data relating to the source and production of livestock in order to improve the quality of meat products and to instill consumer confidence in the meat production industry. While livestock producers and meat packers have a common goal of providing high quality meat at reasonable cost, there remains variability in production efficiency and meat quality. This variability in individual animal production efficiency and individual primal cut quality characteristics (such as weight, conformation, muscling, fat content, etc.) is due to a combination of genetic factors and environmental factors such as health and drug treatments, nutrition and growth history. Many of the genetic and environmental factors could be controlled and managed to improve quality and economic return on investment if accurate and historical information were available throughout the production cycle. While some data collection systems have been proposed to analyze data relating to livestock breeds in order to identify higher performance breeds, there remains a need for data collection on individual feeder facilities in order to improve and maintain the quality of animals reared, particularly in the lamb industry.

For example, U.S. Pat. No. 6,569,092 to Guichon et al. describes a system for monitoring beef cattle throughout their life cycle. The method of the patent tracks tagged animals from conception at a ranch through to their feeding at a packer facility. The animals may be tagged by systems such as radio-frequency identification (RFID), or a global positioning satellite (GPS), or barcodes. In particular, the animals are tracked to determine if they have been exposed to a diseased animal or if they have been close to feeding or watering zones during their lifetimes. The quality of the meat produced is correlated to the time that the animals spend in a feeding or watering zone or near a diseased animal.

U.S. Pat. No. 6,211,789 to Oldham et al. describes a process to improve the quality and economic returns using accurate historical information on livestock. Animals are provided with electronic identification and data on the animals is manually entered into a database using identification codes for each animal. The animal producer fills out information regarding the treatment received by the animal such as its weight, treatments, vaccinations and other significant events that occur in the animal's life and submits it to a central processing office. The information can be shared with third parties such as veterinarians, nutritionists and investors.

U.S. Pat. No. 6,664,897 to Pape et al. describes a computerized data collection system for obtaining information on the events in animals lives. U.S. Pat. No. 6,642,946 to Janes et al. describes a livestock inventory system with a database storage wherein a user can select tables of a database to display in order to graphically show the inventory of livestock.

Despite these advances in livestock management, a need remains for a method of tracking the source of production of animal primal cuts on a detailed basis to provide a quality control system, as well as feedback of information to enhance the quality of the handling and processing of livestock.

SUMMARY OF THE INVENTION

This need is met by the method of the present invention of tracking the source of production of consumable animal primal cuts, particularly cuts of lamb. The process includes breeding a plurality of animals, providing an animal identifier for each of the animals bred at a breeding facility, identifying breeder information for the animals, and selecting the animals into a plurality of lots having similar characteristics, each lot having a lot identifier. The animals are raised in a feeding facility where production data is collected on the animals. The feeding data may include data related to the entire lot of animals or individual animal data. Procedural information on the procedures used at the feeding facility is also obtained. All the breeder information, the animal identifier, lot identifier, lot production data, individual animal production data and feeding facility procedural information is entered into a database. The animals are ultimately processed into primal cuts and the quality of those cuts is qualified.

In one embodiment, the data in the database is fitted to the quality data of the primal cuts. A prediction tool is then provided for determining the action that is needed to improve the primal cut quality based on the fitted data.

The present invention provides advantages, in that by tracking the source of production of consumable animal primal cuts prepared for slaughter, an accurate history of the livestock is obtained which can be used to improve the quality of the primal cuts.

DETAILED DESCRIPTION OF THE INVENTION

The present invention relates to a system and method for tracking the source and production of consumable animal primal cuts, particularly lambs. While the present invention is described in particular reference to production of lamb, this is not meant to be limiting. Other livestock may be produced using the system and method of the present invention.

Figure 1:
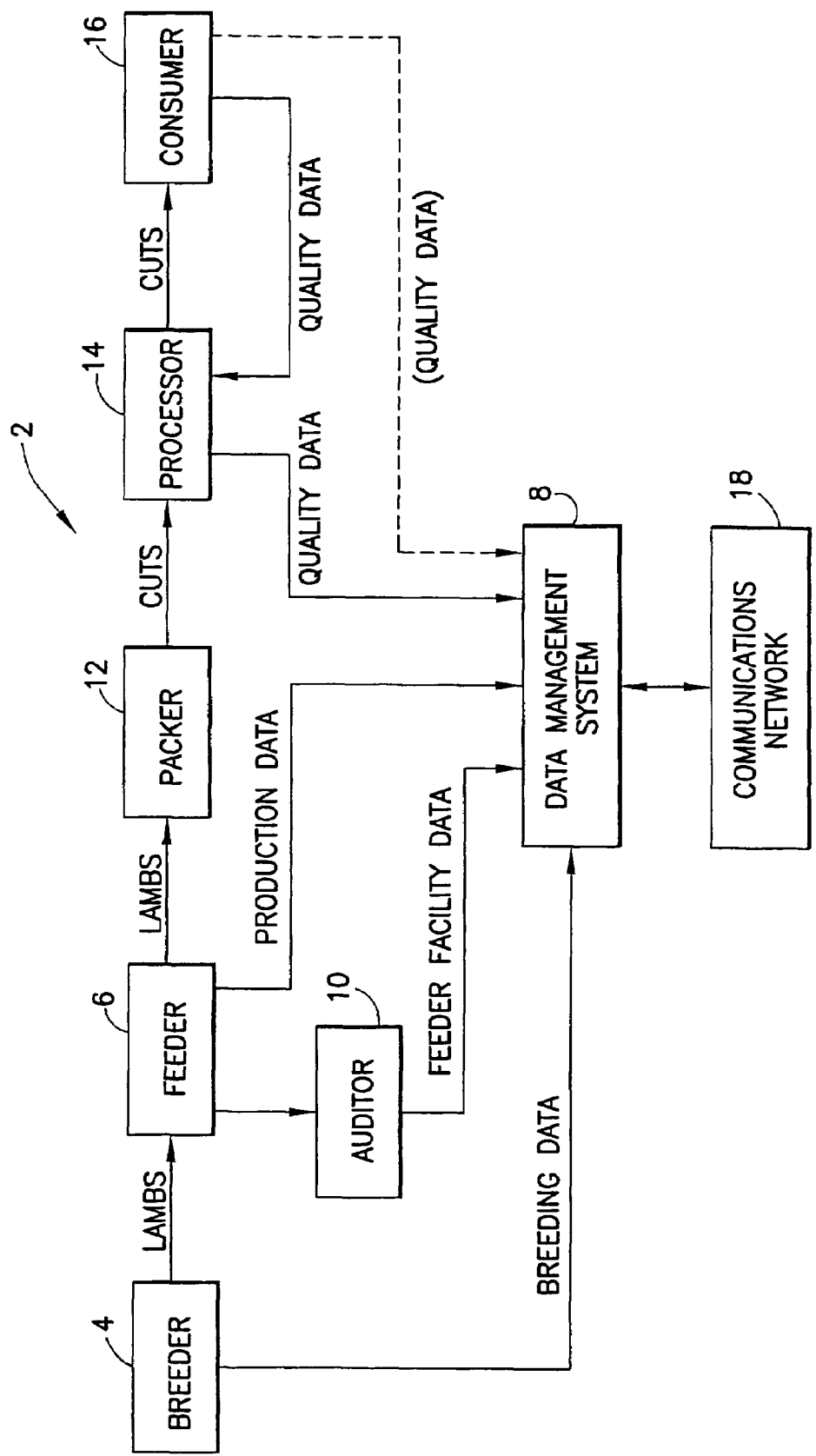
FIG. 1 is a flow-chart illustrating the system of the present invention for conducting livestock management.

Referring to FIG. 1, the present invention includes a system 2 and method for monitoring the production history of consumable animal primal cuts. Lambs born at a breeder's facility 4 are transferred to a feeder's facility 6. Data relating to the breeding of lambs by the breeder 4 is transferred to a data management system 8 containing a database. The lambs are reared at the feeder 6 until they achieve a marketable weight. Production data from the feeder 6 during the rearing time period is collected by the feeder 6 and also provided to the data management system 8. In addition, an auditor 10 collects information from the feeder 6 about procedures conducted at the feeder 6 and provides information on the feeder 6 to the data management system 8. Upon reaching a marketable weight, the lambs are transferred to a packer 12 where the lambs are slaughtered and reduced to primal cuts and that are sent to a processor 14. The processor 14 typically distributes the cuts to consumers such as retailers. The quality of the primal cuts can be assessed by both the processor 14 and the consumer 16.

Typically, the consumer 16 provides information on the quality of the primal cut to the processor 14 that in turn collects its own quality data and transfers all quality data to the data management system 8. The quality data collected by the consumer also can be provided directly to the data management system 8 as indicated in FIG. 1.

The data management system 8 includes computer hardware and software for receiving the breeding data, feeder facility data, production data and quality data. The computer software includes algorithms for sorting the incoming data, producing reports, and correlating the data to determine patterns, trends and functional relationships between the data. While FIG. 1 shows a single breeder 4, feeder 6, packer 12, processor 14 and consumer 16 in system 2, it should be understood that a plurality of each of these entities (all creating their respective data) may be included in the system 2.

The data management system 8 and database thereof is in communication with a communications network 18, whereby the data stored in the data management system 8 can be accessed and analyzed by a user. In this manner, the present invention incorporates existing industry segments within a livestock industry. The communications network 18 may be Internet based. Users may log onto the data management system to access the database at predetermined access levels. For example, a feeder may be permitted to access data relating only to lambs that were reared at its facility. A consumer 16 may have very little access to the database since the upstream functions and procedures resulting in the data may be proprietary. The system 2 and the collection of data during the lifecycle of production of lamb cuts is described in more detail hereinafter.

At the breeder 4, sheep are bred in order to produce one to three lambs per year per ewe. Breeding data is collected by the breeder 4 on the basis of individual animals and for all animals. Identifiers may be provided for each ewe, ram and lamb. The breeding data can include information on the lamb's mother, such as the gestational health of the ewe and its lambing history. For each lamb, the breeding data can include the genetic data on the lamb (i.e. the lamb's ancestry), lamb birthing and rearing data, such as the birth date and birth weight of the lamb, the weaning date and weaning weight for the lamb and records of any treatments, vaccinations and other significant events that have occurred in the lamb's life. The physical location of the breeder 4 may also be included in the breeding data by at least name and location and may further include environmental conditions such as performance of various pastures in which the lamb's mother was kept and climate conditions. The breeder 4 may attach or apply a physical identifier to the lambs such as labeled ear tags or the like, so that the identification of the lambs remains as they are transferred to the feeder 6. Other animal tracking systems can be employed such as RFID or GPS systems. In one embodiment, the lamb is identified with a tag that remains with the animal throughout its life and which is reproduced upon slaughter for association with primal cuts of the animal.

When the lambs reach a sufficient weight to be transferred to the feeder 6, lambs are visually inspected for selection into tiers of animals as an initial quality assessment of the animals arriving at the feeder 6. For example, the lambs may be sorted into two tiers, a first tier of animals having superior physical attributes and a second tier of lesser physical attributes that are generally associated with resulting in primal cuts of superior quality and lesser quality. The animals within each tier are sorted into a plurality of lots of animals having similar characteristics. The animals in each lot are reared together until they reach marketable weights, with some transfer of animals between lots occurring as needed. Each lot has a lot identifier associated therewith so that every animal has an individual animal identifier and a lot identifier. The animals may be sorted into lots based on various criteria including age, sex, size, and/or physical conformation. During the next several months, the animals are reared to grow, gain weight and improve muscle characteristics.

Procedures performed on each lot of animals (all animals in the lot receiving those procedures) are recorded as lot-based production data. These procedures include the date that the lot was created, treatments to the water supply (such as addition of sulfa), dietary supplements added to the water (such as vitamins and electrolytes), worming treatments, vaccinations (such as for overeating), shearing and treatments for disease (such as for *coccidiosis*). Each of the lot-based treatments received by the animals includes information on the date on which the treatment occurred, identification of any products that were used to effect the treatment (such as the tradename and chemical name of a veterinary medicine) and identification of the personnel performing the treatment to the lot of animals. If one animal within the lot succumbs to illness, this is noted for all animals within the lot. Likewise, if an animal is removed from the lot for treatment, whether for isolation of a diseased animal or other purposes, this information is included in the lot-based production data provided to the data management system 8. In one embodiment of the invention, the breeder 4 prepares a document containing information of all activity for each lot of animals at its facility and submits the document to the data management system 8 either in paper form (for manual entry of the data in the database) or directly by electronic means on a periodic basis such as weekly.

Data on individual animals reared at the feeder 6 is also collected and provided to the data management system 8. Examples of animal-based production data include operations such as segregation of an animal, movement of an animal from one lot to another lot, individual treatment such as for illness or the like, loss or replacement of an identification tag, euthanasia and the like. Illnesses, including infections, which may be noted in the animal individual production data include worms, pneumonia, *coccidiosis,* injury, polio, sore mouth, prolapse, overeating and urinary calculi. If an animal succumbs to a predator or dies for other reasons, this is noted in the individual animal production data. Similar to the collection and transmission of lot-based animal data discussed above, the feeder 6 produces an animal activity report on each individual animal that contains the animal-based data and includes the lot identifier for the animal, as well as feeder facility identification and transmits this information to the data management system 8. Additional animal-based production data includes data on the shipment of animals sent to slaughter, including at least the shipment date, animal weight and animal identification. Alternatively, if an entire lot of animals is shipped to slaughter, the data management system 8 may be updated by submitting information indicating that all animals within a lot had been shipped to slaughter.

Additional production data provided to the data management system 8 includes information that is typically general to all animals raised by the feeder 6 such as information on the water and feed (including forage materials) used in rearing the animals. This nutritional data may be conducted by a facility other than the feeder 4, such as a commercial analysis laboratory. The frequency with which a nutritional analysis of the water and feed (including forage material) is conducted may vary with the frequency of known shifts in the supplier of these materials to the feeder 4. The water data may include information obtained by testing the water consumed by the animals for at least the following constituents: nitrate, nitrogen, pH, hardness, iron, phosphorous, calcium, potassium, magnesium, copper, manganese, zinc sulfate, sodium chloride and total percent dissolved solids. Likewise, analysis of the feed received by animals at the feeder 6 is obtained and may include information on the amount of moisture, dry matter, protein fat, crude fiber, calcium, phosphorous, potassium and magnesium in the feed. For forage material consumed by the animals, an analysis thereof may produce information including amounts of moisture, dry matter, total protein, heat damageable protein, available protein and digestible protein, soluble protein, acid detergent fiber, neutral detergent fiber, neutral detergent insoluble protein, digestible calcium and phosphorous protein, as well as information on protein solubility, protein degradability, non-protein nutrients (NPN) protein equivalent, an assessment of the relative feed value and caloric content. Typically, for each feeder 6, the water, feed and forage analysis is uniform for all animals in all lots. However, to the extent that certain animals receive different water, feed or forage material, additional data on the quality of those materials is also submitted to the data management system 8.

Figure 2:
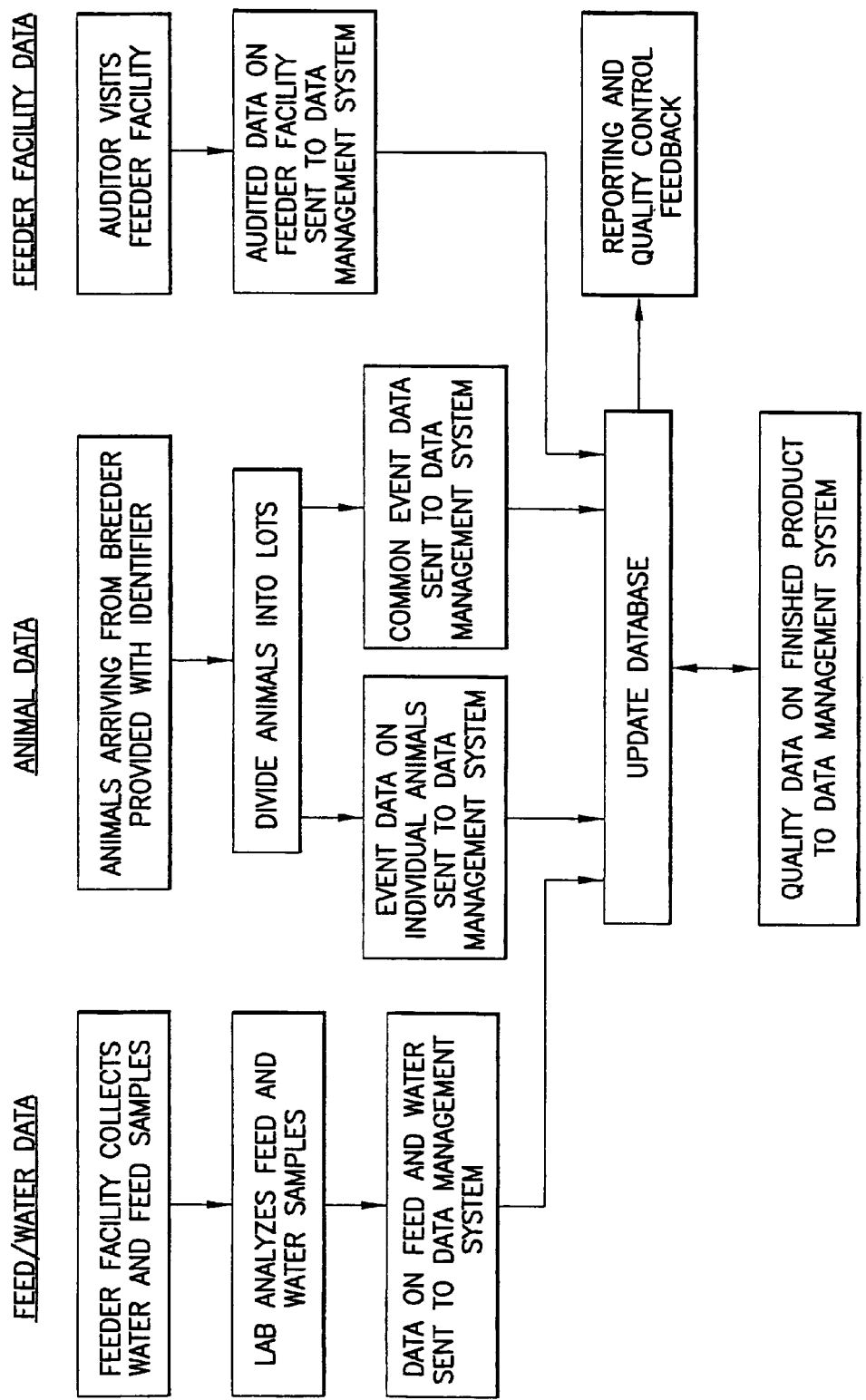
FIG. 2 is a block diagram of the data collection processes performed in the present invention.

FIG. 2 shows a flow chart of the data collection according to the present invention. Two sources of data provided to the data management system 8 for updating the database are provided by the feeder 6 including (1) the water and feed data and (2) animal data by individual animal and by lot. In addition, production data on the feeder 6 is provided to the data management system 8 via the auditor 10. In one embodiment, the auditor 10 visits the feeder 6 and questions the feeder 6 regarding its procedures and policies such as information regarding the feeding stock, feeding water, raising conditions, animal husbandry procedures and marketing of lambs. The auditor 10 gathers this information about how the feeder 6 operates and sends that data to the data management system 8.

Information regarding the feeding stock includes the age at which lambs are received from a ewe farm, the weight of the lambs received (by average, heaviest and lightest), the breed of lambs handled, breed of lambs that are not handled, acceptance of male lambs, percentage of male lambs normally received, percentage of lambs that are deceased when received from the breeder, quantity of lots of lambs reared in a period (such as one year), quantity of lambs per lot, quantity of lambs being reared at the time of the audit, the maximum number of lambs accepted at any time at the feeder 6 and an indication of whether lambs are tagged upon their receipt by the feeder 6. Information relating to feed and water includes the water source (i.e., from a well or municipal source), procedures for testing water (along with acceptable limits and frequency of testing), types of feed used (starter, intermediate or finisher), source of forage material (homegrown or purchased, use of fertilizers and pesticides applied to homegrown forage, analysis of purchased forage from one or more suppliers) timing of switching from one feed to the next, ability to weigh lambs, frequency of weighing lambs, procedures to control the amount of feed given to a lamb by weight or by age, use of electrolytes added to drinking water by amount and product name, use of sulfa added to drinking water, and vaccinations provided to prevent overeating.

Information collected by the auditor 10 related to raising conditions includes whether lambs are isolated upon their arrival from other lambs already at feeder 6 to stabilize the lambs after their transportation from the breeder 4 and the length of time that lambs are isolated, whether the lots of lambs are kept together for their entire rearing at the feeder 4, shearing of lambs during their raising (frequency and weather conditions prior to shearing), and success rate in raising certain breeds of lambs (including standards for measuring success). Information regarding the animal husbandry practiced by the feeder 4 includes whether or not lambs are inspected daily for health problems, whether sick animals are separated from healthy lambs, whether sick lambs are returned to the original flock when healthy, percentage of lambs that survive, procedures for handling dead lambs, procedures for handling downer lambs, whether routine worming of lambs is conducted (including timing thereof) and whether treatment for *coccidiosis* is administered, including medication therefor. Information collected by the auditor 10 relating to the readiness of lambs for market include the lamb weight parameters and standards for selection based on lamb conformation.

In one embodiment of the invention, the product quality of primal cuts produced from livestock raised according to the present invention are determined. The primal cuts may be qualified on a scale such as at quality levels of one to five. The quality of the product may be determined by qualitative characteristics, as well as quantitative values. Qualitative characteristics may include USDA equivalent, degree of marbling, fibrosity of muscle composition, length of fibered tissue, muscle color, fat color, fat composition, density of muscle groups, pallate characteristic of fat (lack of aftertaste), development of carcass primals, development of connective tissue, bone hardness, marrow color, joint calcification, thymus development, presence of flushed break joints and rib eye continuance. Quantitative distinctions include size of center cut rib eye, carcass development, amount of back fat, carcass weight range, meat to bone ratio, bone-out percentage, percent yield of primal cuts, carcass body length, rib to rack spacing, leg set position, brisket position, height of leg appearance, presence of seam fat and carcass shoulder breadth and back conformation. These examples of factors for assessing quality of a primal cut are not meant to be limiting. Other quality indicators may be used alone or in combination with those described herein.

The quality data may be collected by one or both of the processor 14 and consumer 16. As shown in FIG. 1, the quality data is provided to the data management system 8 along with the breeding data, feeder facility data and production data. The data management system 8 correlates the quality data with the breeding data, feeder facility data and production data to identify factors in the breeding and raising of the lambs that impact primal cut quality. When an animal receives an identifier that can be reproduced in the primal cuts, the ability to correlate primal cut quality with the animal's breeding and raising history is enhanced. The identifier remains with the animal through its entire life and with primal cuts of the slaughtered animal. Such a reproducible identifier (e.g., a bar code or RFID tag) allows a user of the system 2 to track all activity and treatment of the animal that resulted in primal cuts of a certain quality. An identifier that remains with the primal cuts also permits tracking of the source of the primal cuts. In the event of a quality problem, the source of the primal cuts can be determined.

The data management system 8 can be used to correlate the breeding data, feeder facility data and production data to look for trends in the management of livestock. In this manner, the data is a fingerprint of an animal raised according to the system and method of the present invention. For example, the data management system 8 may sort the data for feeders that utilize water having a particular set of components to determine if a certain contaminant results in any difference in the frequency of animal illness compared to the average. By collecting data over a period of time, a user of the data management system 8 may note that feeders not segregating animals into lots by size and weight experience minimal differences in treatments needed to maintain those lots. Similarly, the data may be analyzed to correlate feed compositions with quality data. For example, the data may show that one feeder 4 using a first feed composition consistently produces animals generating high quality primal cuts while another feeder 4 using a second feed composition consistently produces animals generating lower quality primal cuts. Other animal rearing factors that can be correlated with primal cut quality include animal husbandry practices such as animal density and shearing. Animal density (i.e., the quantity of animals per square foot) and frequency of shearing are examples of animal husbandry practices that can impact primal cut quality. Animal density can affect the opportunity for spreading disease. The frequency of shearing can affect the amount of space available for animals, animal water consumption and waste production (unsheared lambs excreting more fluids), rate of animal weight gain and general animal contentedness.

When the quality data is included in an analysis of the data maintained by the data management system 8, the system 2 can be used for quality control purposes. For example, data analysis may reveal that two feeders are consistently producing superior lambs as determined by primal cut quality. The data management system 8 may be operated to reveal differences between those two feeders and other feeders within the system 2 so that the other feeders can alter their practices to likewise produce superior lambs.

In one embodiment of the invention, the data collected (breeding data, feeder facility data, production data and quality data) may be analyzed in the data management system 8 in an actuarial process. Each piece of data may be assigned a numerical value. The total of all these data values (the data optionally being weighted for more critical practices) is the actuarial value for an animal. A lamb produced according to the present invention can be considered to have an actuarial value based on the numerical values of the data from its rearing. In this manner, the present invention may be used to provide a quantitative determination of primal cut quality.

Although particular embodiments of the present invention have been described, various modifications may be made without departing form the spirit and scope thereof as defined by the appended claims.

The invention claimed is:

1. A method of monitoring the production history of consumable animal primal cuts comprising the steps of:
   breeding a plurality of animals;
   providing an animal identifier for a plurality of animals bred at a breeding facility and identifying breeding data information for the animals;

selecting the animals into a plurality of lots of animals having similar characteristics, each lot having a lot identifier;

raising the animals at a feeding facility;

collecting production data on the animals in the feeding facility, the production data being selected from the group consisting of lot production data and individual animal production data;

obtaining feeder facility data on the procedures used at the feeding facility;

entering the breeding data, the animal identifier, lot identifier, lot production data, individual animal production data and feeding facility data into a database;

transferring the animals to a processing facility;

processing the animals in the processing facility into primal cuts; and assessing the quality of the primal cuts and entering the quality data into the database.

2. The method of claim 1, further comprising:

fitting the data in the database to the quality data of the primal cuts; and determining action needed to improve the primal cut quality.

3. The method of claim 1, wherein the animals are lambs.

4. The method of claim 3, wherein the breeding data is at least one selected from the group consisting of genetic data on each lamb, mother ewe health and lambing history, and lamb birthing and rearing data.

5. The method of claim 3, wherein the characteristics for selecting the animals into lots is at least one selected from the group consisting of age, sex, size and conformation.

6. The method of claim 3, wherein the lot production data is at least one selected from the group consisting of feed composition, foraged material composition, water composition, veterinary treatments given to all animals in a lot and exposure to sick animals.

7. The method of claim 3, wherein the individual animal production data is at least one selected from the group consisting of breeder information, size, health and treatments for illness.

8. The method of claim 3, wherein the feeding facility data is at least one of feeding stock, watering and feeding data, raising conditions, health procedures and market parameters for determining readiness for slaughter.

9. The method of claim 1, wherein the animal identifier comprises a tracking component, the tracking component remains with the animal through the step of qualifying the primal cuts.

10. The method of claim 1, further comprising accessing the database to retrieve the data as a function of breeder identifier, animal identifier, lot number or feeding facility.

11. A consumable animal primal cut produced by the method of claim 1.

* * * * *